Aug. 29, 1961 M. LIPKINS 2,998,256
VACUUM SYSTEMS
Filed Feb. 10, 1958
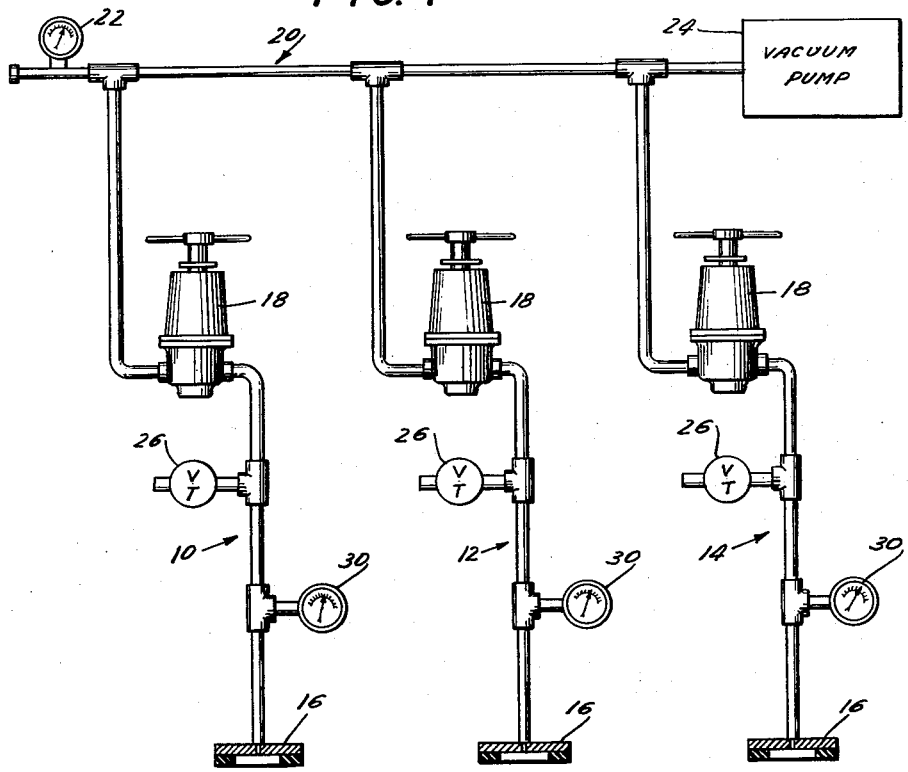
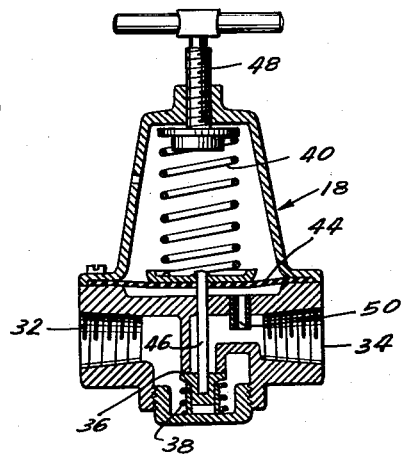
INVENTOR
MORTON LIPKINS
BY
ATTORNEY

2,998,256
VACUUM SYSTEMS
Morton Lipkins, 3 Nemeth St., Malverne, N.Y.
Filed Feb. 10, 1958, Ser. No. 714,365
10 Claims. (Cl. 279—3)

The present invention relates to vacuum systems.

An object of this invention is to provide a system enabling a single vacuum pump to serve multiple vacuum lines, each operating at its own partial pressure. A further object is to provide a novel apparatus for controlling the pressure in one or more vacuum lines.

The present invention makes possible the use of a single vacuum pump and manifold to maintain vacuum in multiple lines; and a further feature of the invention makes possible the maintenance of different partial pressures in each line of multiple vacuum lines all connected to a common vacuum manifold. Such a system is useful, for example, in the operation of multiple vacuum chucks, as for independently holding multiple individual optical pieces to be processed. Some pieces may require a good vacuum for holding them securely on the chuck. In other cases, strong holding force is not the main consideration and there is some danger of a good vacuum deforming the article. In such circumstances, a poorer vacuum should be maintained. The illustrative embodiment of the invention described in detail below accomplishes this in a system having multiple vacuum lines connected to a vacuum manifold. An individual vacuum chuck is actuated by each line. A gas pressure regulating valve is interposed between the chuck and the manifold, and a throttle valve is connected to the line as a branch leak to the atmosphere, between the chuck and the gas pressure regulating valve. The gas pressure regulating valves are arranged with their controlled pressure delivery ends connected to the vacuum manifold and with their uncontrolled inlets connected to the respective lines leading to the vacuum chucks. The partial pressure in each vacuum line is adjusted basically through the setting of the regulating valve and then by adjusting the leakage or air inlet valve. The desired individual pressures are established in each of the several partial vacuum lines, and thereafter the adjustment is automatically maintained.

It is necessary in routine operation to break the vacuum in a line in order to remove one article from a vacuum chuck and replace it with another. When this becomes necessary, the throttle valve can be manipulated so as to admit full atmospheric pressure to that vacuum line, thereby releasing the article. When a new article is mounted on the chuck, it is held there by readjusting the throttle or air leakage valve to establish the desired partial pressure as indicated by a vacuum gauge in the line. This adjusted pressure is thereafter maintained within close limits. The adjusted vacuum in any one line is not appreciably disturbed even by raising the pressure in another line to atmospheric pressure, as occurs when an article is removed from a chuck.

The regulating valve may be of a customary type heretofore used for delivering gas at a constant output pressure from a high pressure supply whose pressure may vary widely from time to time. One common type of suitable gas pressure regulating valve is the form in which there is a valve-actuating diaphragm, an adjusting spring acting on the valve in the valve-opening direction, and another spring providing valve-closing bias. Atmospheric pressure acts on the diaphragm at the side causing valve-opening force, and the gas-pressure at the downstream or regulated side of this type of valve exerts valve-closing force on the diaphragm. In its customary application, there is a high pressure on the inlet side of the regulating valve, and the regulated gas pressure also exceeds atmospheric pressure. In its usual environment, the valve is set so that the net spring bias acts in the valve-opening direction. The arrangement is such that any increase in delivered gas pressure will bias the diaphragm in the direction to further restrict the flow of gas through the valve and thereby maintain the initial adjusted condition. Such pressure regulating valves are commonly used with a variable high pressure supply of gas and are intended to deliver gas at a uniform reduced pressure. If multiple valves of this type were connected with their high pressure sides to a supply of compressed gas, each could be adjusted so as to deliver gas at a constant pressure in a separate line at its down-stream side, each delivered gas pressure being different from the others and each being substantially constant despite variations in the supply pressure or in the adjustment of the other gas pressure regulating valves of the system. Another suitable type of valve is the pilot-controlled gas regulator valve.

In contrast to their usual application, such regulator valves are here used as what might be called vacuum regulator valves. The regulated delivery sides of the regulator valves are here connected to a vacuum manifold where the pressure is to remain comparatively constant under all conditions; and the inlet side of each regulator valve is connected to its respective line whose partial pressure is to be maintained. Each such partial pressure line includes a constricted air inlet passage. By appropriately establishing the size of the air inlet constriction, any desired partial pressure in the partial pressure line may be established, which may be any value between atmospheric pressure and that of the vacuum manifold.

The nature of the invention will be better appreciated from the following detailed description of what is presently considered to be the preferred embodiment of the invention. From this disclosure further objects and features of novelty will be apparent.

In the accompanying drawings:

FIG. 1 is a diagrammatic illustration of an embodiment of the invention; and

FIG. 2 is a vertical cross-section through a pressure regulator valve, diagrammatic in matters of detail, used in the embodiment of FIG. 1.

In FIG. 1 multiple lines generally indicated by the numerals 10, 12 and 14 (which are herein termed partial pressure lines for reference) have a series of chucks 16 connected to them for holding articles such as optical parts accurately and securely in position for any of a wide variety of operations thereon. Between vacuum manifold 20 and each line 10, 12 and 14 is a gas pressure regulating valve 18 whose "unregulated" upstream side is connected to its respective partial pressure line 10, 12 or 14. The regulated, down-stream side of each pressure regulating valve is connected to vacuum manifold 20. A vacuum gauge 22 is also connected to vacuum manifold 20, and a vacuum pump 24 maintains the desired vacuum in this manifold.

Line 10 includes a throttle valve 26 in a branch which provides controlled leakage of air from the atmosphere to line 10; and valves 26 are similarly provided in lines 12 and 14. Each line includes its own pressure gauge 30.

In FIG. 2 there is illustrated in diagrammatic form a gas pressure regulating valve 18, which is of a type suitable for use in the system of FIG. 1. This valve includes an unregulated inlet side 32, a regulated outlet side 34, and a valve 36 that is biased by its spring 38 against the valve seat. A spring 40 bears against a diaphragm 44 to urge that diaphragm downward. A shaft 46 connects diaphragm 44 to valve 36. In the customary application of this valve adjustable hand screw 48 is relied on to adjust the downward spring bias on diaphragm 44 so as to admit gas under high pressure from the supply side 32 through valve 36 to the outlet side of the regulator valve, passage 50 admitting gas at the delivered pressure to the lower side of diaphragm 44.

The degree to which valve 36 opens to allow flow of gas is controlled by adjusting the compression in spring 40. Air at atmospheric pressure bears against the upper side of diaphragm 44. The spring and the atmospheric pressure tend to open valve 36. Spring 38 directly associated with the valve tends to close that valve, and the pressure of the gas at the lower side of diaphragm 44 as determined by the pressure in the delivery line 34 of the valve establishes a balance which determines the pressure of the delivered gas in conventional applications. There is a net pressure difference acting on the diaphragm in the valve-closing direction in the usual application of the regulating valve, and the spring adjustment provides a net valve-opening bias to establish a balance. Changes in gas pressure at the down-stream side of the valve change the pressure at the lower side of the diaphragm and thereby actuate the valve to maintain the down-stream gas pressure at a regulated, very nearly constant value.

In the system of FIG. 1, each valve 18 does not have the primary function of delivering gas or air at a regulated pressure as in the usual application of pressure regulating valves. Instead, these valves form a part of a system in which the ordinarily unregulated inlet sides of the pressure regulating valves become the controllable pressure level in the illustrated system.

In operation, a definite vacuum may be maintained in the manifold. This is done by separated adjusting each regulator with its inlet side open to the atmosphere and the inlet sides of the other lines blocked. Thereafter, any desired vacuum up to the manifold vacuum can be maintained in each of the lines 10, 12 and 14 by adjusting the leakage to atmosphere using valves 26. In the adjusted condition of the valves 18, it is evident that the air pressure at the lower surface of diaphragm 44 is only a partial pressure, and that the atmospheric pressure at the top of this diaphragm produces a net valve-opening force. Consequently, in this application, the regulating valves in their adjustment as described will be found to have a net spring bias in the direction opposite to the net valve-opening force developed by the diaphragm. The system or manifold vacuum may be 2 inches of mercury, and the pressures in the three lines 10, 12 and 14 may be 10 inches, 10 inches, and 20 inches, respectively, in an example.

If it were desired to remove one of the articles from the chuck 16, it is only necessary to open the related throttle valve 26 and admit air at atmospheric pressure to the partial pressure line 10, 12 or 14. This naturally releases the article held by chuck 16, but this does not noticeably disturb the system. Pressure regulating valve 18 of that line evidently protects the vacuum of the manifold system, its diaphragm 44 reducing the valve opening in response to a slight decrease in manifold vacuum.

Modifications and varied application of the foregoing system will inevitably be suggested to those skilled in the art by this illustrative disclosure. Consequently this invention should be broadly construed in a manner consistent with its full spirit and scope.

What is claimed is:

1. A system for providing multiple vacuum lines each at a partial atmospheric pressure, including multiple vacuum lines each having a portion thereof adapted for connection to a respective device operable at partial pressure, a vacuum manifold, and a regulating valve for each of said vacuum lines, respectively, each said regulating valve being of a form having a pressure-responsive valve-actuating member oppositely exposed to the regulated pressure at the controlled-pressure side of the valve and to a reference pressure, respectively, and said valve having mechanical biasing means opposing and adjustably balancing the difference between said pressures when said regulated pressure is at a predetermined partial pressure of the vacuum manifold, said regulating valve having the controlled-pressure outlet side thereof connected to said vacuum manifold and having the input side thereof connected to a respective one of said vacuum lines.

2. A system for providing multiple vacuum lines each at its individual partial atmospheric pressure, including multiple vacuum lines, each having a portion thereof adapted for connection to a respective device requiring such partial pressure, a vacuum manifold, and a regulating valve for each of said vacuum lines, respectively, each said regulating valve being of a form having a pressure-responsive valve-actuating member oppositely exposed to the regulated pressure at the controlled-pressure side of the valve and to a reference pressure, respectively, and said valve having mechanical biasing means opposing and adjustably balancing the difference between said pressures when said regulated pressure is at a predetermined partial pressure of the vacuum manifold, said regulating valve having the controlled-pressure outlet side thereof connected to said vacuum manifold and having the input side thereof connected to a respective one of said vacuum lines, each of said vacuum lines including throttling means providing a restricted air inlet and effective with its associated regulating valve to provide an individually controlled partial pressure independent of the other vacuum lines.

3. A system for providing multiple vacuum lines each at its individual partial atmospheric pressure, including multiple vacuum lines, a vacuum manifold, and a regulating valve for each of said vacuum lines, respectively, each said regulating valve being of a form having a pressure-responsive valve-actuating member oppositely exposed to the regulated pressure at the controlled-pressure side of the valve and to a reference pressure, respectively, and said valve having mechanical biasing means opposing and adjustably balancing the difference between said pressures when said regulated pressure is at a predetermined partial pressure of the vacuum manifold, said regulating valve having the controlled-pressure outlet side thereof connected to said vacuum manifold and having the input side thereof connected to a respective one of said vacuum lines, each vacuum line including an article holding chuck having means forming an airtight seal to an article to be held thereby, and a constricted branch air inlet to each vacuum line.

4. A system for providing multiple vacuum lines each at a partial atmospheric pressure, including multiple vacuum lines, a vacuum manifold, a regulating valve for each of said lines, respectively, each regulating valve being of a form having a partial-pressure-responsive valve-actuating member and adjustable mechanical valve-biasing means arranged to act with said pressure-responsive member to regulate the flow through the valve, said regulating valve having the outlet side thereof connected to said vacuum manifold and having the input side thereof connected to a respective one of said vacuum lines, a partial pressure actuated appliance connected to each vacuum line respectively, and control means in each vacuum line to admit air thereto.

5. A system having a vacuum pump and multiple vacuum lines each at its individual partial atmospheric pressure, a vacuum manifold connected to said vacuum pump, a respective regulating valve between each said vacuum line and said manifold, each regulating valve having a partial-pressure-responsive valve-actuating member and adjustable mechanical valve-biasing means balancing the action of the vacuum pump partial pressure on the pressure-responsive member at a restricted-flow adjusted condition of the valve, the controlled-pressure outlet side of each regulating valve being connected to said manifold, and adjustable means at the input side of each regulating valve, respectively, providing a branch air inlet to control the partial pressure in the related vacuum line and each line having an inlet for connection to a partial-pressure-actuated device.

6. A subcombination for use in a system for operating multiple vacuum lines from a common vacuum pump, including a vacuum manifold having an outlet to such vacuum pump, an individual gas pressure-regulating valve for each of said lines, each said regulating valve being of the type having a valve-actuating diaphragm the opposite sides of which are exposed to atmospheric pressure and to the pressure to be regulated, respectively, and adjustable spring biasing means operative to balance the net pressure of the diaphragm against the valve when the partial-pressure of a vacuum pump acts on the diaphragm, the controlled delivery side of each pressure-regulating valve being connected to the vacuum manifold, individual vacuum lines connected to the input sides of said pressure-regulating valves, and throttle valves providing controlled air leakage into said vacuum lines, respectively, each throttle valve being connected as a branch to its individual vacuum line, and means in each said line providing an inlet connection from a device to be actuated by partial pressure.

7. In combination, plural vacuum chucks, each having means adapted to form a retentive seal to an article to be held thereby and provided with a partial pressure line, a gas pressure regulating valve of the type having a valve-actuating diaphragm exposed to atmospheric pressure in the valve-opening direction and adjustable spring biasing means for said valve acting with balancing force in the valve-closing direction in the adjustment thereof that renders the valve effective to respond to changes of partial pressures, said valve having its inlet side connected to said partial pressure line and having its controlled output side connected to a common line constituting a vacuum manifold, and control means to admit air to each partial pressure line individually.

8. In combination, a vacuum-actuated appliance, a vacuum pump, and means providing said appliance with controlled partial pressure between the vacuum of the pump and atmospheric pressure, said means including a line connected to said appliance, a gas pressure regulating valve interposed in said line, said regulating valve being of the form having a valve-actuating pressure-responsive diaphragm exposed to atmospheric pressure in the valve-opening direction and having adjustable spring biasing means acting, when adjusted for partial pressure regulation, in the valve-closing direction and effective to establish restricted-flow conditions in such adjustment, said regulating valve having its regulated side connected to said vacuum pump and having its unregulated side connected to said appliance, and a throttled branch inlet to said line.

9. As a subcombination for providing a vacuum-actuated appliance with a controlled partial pressure above that of a vacuum line, a branching line having one inlet for said appliance, a throttle valve connected as a controlled leak to another inlet of said branching line, and a gas pressure regulating valve of the type having a valve-actuating pressure-responsive diaphragm exposed to atmospheric pressure and biased thereby in the valve-opening direction and having adjustable spring means biasing the valve in the closing direction and effective to establish restricted-flow conditions when the diaphragm is also exposed to the partial pressure of such vacuum line, said valve having its unregulated inlet side connected to the outlet side of said branching line, with the outlet side of the gas pressure regulating valve being available for connection to the vacuum line.

10. As a subcombination for providing multiple vacuum-actuated appliances with respective controlled partial pressures above that of a common vacuum line, a respective branching line for each appliance having one inlet for said appliance, a throttle valve connected as a controlled leak to another inlet of said branching line, a gas pressure regulating valve of the type having a valve-actuating diaphragm exposed to atmospheric pressure in the direction causing valve-opening bias and having spring biasing means adjustable to balance said bias with the partial pressure of the common vacuum line acting on the diaphragm opposite to said atmospheric-pressure bias, said valve having its unregulated inlet side connected to the outlet side of said branching line, and a vacuum manifold connected to the outlet sides of all the gas pressure regulating valves.

References Cited in the file of this patent

UNITED STATES PATENTS

| | | |
|---|---|---|
| 1,041,028 | Church | Oct. 15, 1912 |
| 1,318,350 | Brown | Oct. 14, 1919 |
| 1,518,984 | Kien | Dec. 9, 1924 |
| 1,556,072 | Buck | Oct. 6, 1925 |
| 1,598,766 | Fox | Sept. 7, 1926 |
| 1,620,322 | Browne | Mar. 8, 1927 |
| 2,051,662 | Wells | Aug. 18, 1936 |
| 2,288,733 | Neisemann | July 7, 1942 |